W. F. WEATHERLY.
PNEUMATIC CAR STEP.
APPLICATION FILED MAR. 31, 1911.
1,012,773.
Patented Dec. 26, 1911.
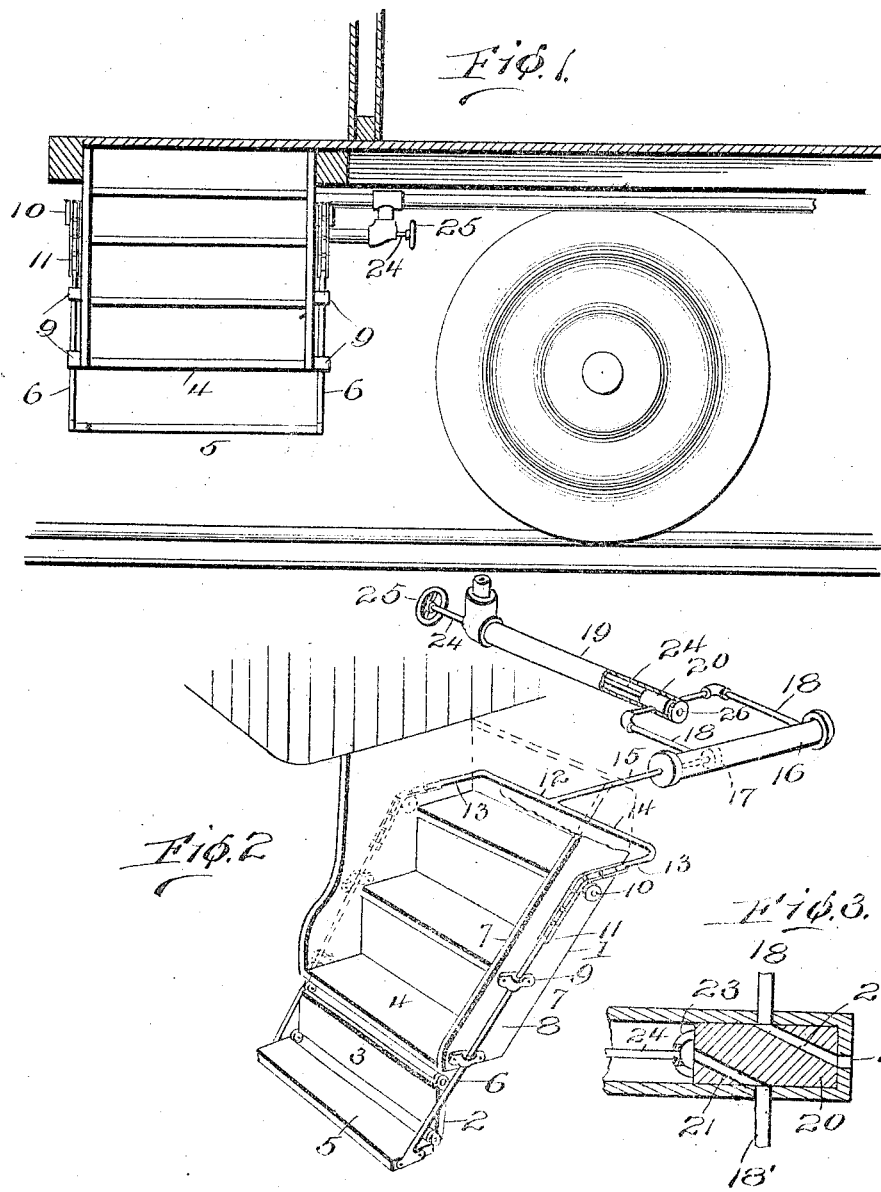

UNITED STATES PATENT OFFICE.

WILLIAM FRANKLIN WEATHERLY, OF CAMPBELL, MISSOURI, ASSIGNOR OF ONE-HALF TO A. W. CAGLE, OF CAMPBELL, MISSOURI.

PNEUMATIC CAR-STEP.

1,012,773. Specification of Letters Patent. Patented Dec. 26, 1911.

Application filed March 31, 1911. Serial No. 618,237.

*To all whom it may concern:*

Be it known that I, WILLIAM F. WEATHERLY, a citizen of the United States, residing at Campbell, in the county of Dunklin and State of Missouri, have invented certain new and useful Improvements in Pneumatic Car-Steps, of which the following is a specification.

My invention has relation to new and useful improvements in passenger car step extensions and the main object thereof is to produce an extension of this nature which is pneumatically operated.

A further object of my invention is to produce a pneumatic car step that will be efficient in operation, durable and one which may be inexpensive to install.

A further object of my invention is to provide an extension pneumatic car step that may be extended or contracted by the operation of the same hand wheel, and I provide means whereby it is possible for the steps to be expanded and contracted by the same hand wheel.

With the foregoing and other objects in view my invention consists of the novel construction, combination and arrangement of parts as are described in this specification, illustrated in the accompanying drawings forming a part thereof and particularly pointed out in the appended claims.

Reference being had to the drawings: Figure 1 is a partial, vertical, sectional view of one end of a car to which my invention has been applied. Fig. 2 is a perspective view of my invention, parts being indicated by dotted lines. Fig. 3 is a horizontal, sectional view showing in detail, on an enlarged scale, the type of valve employed at the forward end of the air pipe 19.

Referring more particularly to the drawings in which like numerals designate like parts throughout, my invention is described as follows.

The permanent or stationary steps 1 are provided at their lower extremity with the step or steps 2 which are non-permanent, they being adapted to be either extended or contracted as is necessary. The riser 3 of the step or steps 2 is hingedly connected to the forward edge of the bottom step 4 of the permanent steps 1, said riser, of course, extending vertically when the steps are in extended position. Each tread 5 of the step or steps 2 is hingedly connected to the lower edge of its respective riser 3 and extends in a horizontal position when the steps are extended as illustrated in Fig. 2. Secured to each end of the lowest foldable step is a rod 6, which extends slantingly upward therefrom in parallel relation to the edges 7 of the outer side 8 of the permanent steps 1. Said rods 6 are slidably held in position to respective sides of the permanent steps 1 by means of brackets 9 which brackets are secured in position by any suitable means. Connected to the upper end of each rod 6 and traveling upon a respective roller 10 rotatably mounted to its corresponding side of the permanent steps 1 is a chain 11. Secured to the other end of each chain by suitable means are respective ends of a T-rod 12 which ends 13 are bent forwardly at right angles to the main portion 14 thereof in order to meet the ends of their respective chains 11. The other extension 15 of the T-rod extends into a cylinder 16 which is located exactly in the rear of the permanent steps. A piston head 17 is provided at the inner end of the extension 15.

Extending from each end of the cylinder 16 and in communication therewith are pipes 18 and 18', each of said pipes extending inwardly at their opposite ends and communicating with the air pipe 19. Said air pipe 19 is provided within with a valve 20, said valve 20 having provided therein ducts 21 and 22. Extending from the rear end of the valve 20 and held in connection therewith by means of brackets 23 is a rod 24, the opposite extremity of said rod 24 being without the air pipe 19 and being provided with a hand wheel 25, heretofore mentioned.

It may be here stated that steam may be employed, if desired, in lieu of air, but as air is more commonly employed for the operation of brakes or the like and it may be conveniently communicated to the apparatus of this invention, it is preferable that air be employed for the foregoing reasons and also in view of the fact that it is felt that air will give better satisfaction than steam.

The means of permitting the air to enter the cylinder 16 will now be described: It will be understood that the air is at all times present in the air pipe 19 under compression, and thus it will be seen that when it is desired to contract the steps 2 the hand wheel is turned so that the pipe 18' will be in communication with the air pipe 19 by means of the duct 21. Simultaneously the pipe 18 will be in communication with the atmosphere by means of the duct 22 and the port 26 provided in the forward end of the air pipe 19. The pressure of the air will therefore retain the steps 2 in contracted or folded position. When it is desired to extend the steps and secure them in extended position, the hand wheel is turned so that the pipe 18 will be in communication with the air pipe 19 by means of the duct 21. Simultaneously the pipe 18' will be in communication with the atmosphere by means of the duct 22 and said port 26. Thus the air will be allowed to enter the cylinder 16 on the opposite side of the piston head 17 which action will force the steps into extended position, as illustrated in Fig. 2, and they will be held in such position until it is desired to place them in contracted position as above explained.

When steam is employed in lieu of air the operation of the device will remain the same, and therefore it is not deemed necessary to dwell upon this feature of the invention more than simply to mention it as a fact, it being further thought that the construction and operation of the invention will be fully understood by any person skilled in the art without a more extended explanation. However, I reserve the right to make such changes in the construction of my invention as will not depart from the spirit thereof or the scope of the claims hereunto appended.

Having described my invention, what I claim as new and desire to secure by Letters Patent, is:

1. In a pneumatic car step comprising a plurality of permanent steps, a foldable step or plurality of steps hingedly connected to the forward edge of the lowest step, said foldable step or steps adapted to be expanded or contracted as desired, means to expand or contract said step or steps consisting of one rod secured to each end edge of the tread of the lowest step and extending slantingly upward in parallel relation to the edges of the sides of the permanent steps, said rods being slidably secured to their respective sides of the permanent steps, means to pneumatically draw the rods upward comprising an air cylinder and piston head, to which piston head is secured an extension, and means of connection between the extension and each of said rods.

2. In a pneumatic car step comprising a plurality of permanent steps, a foldable step or plurality of steps hingedly connected to the forward edge of the lowest step, said foldable step or steps adapted to be expanded or contracted as desired, means to expand or contract said step or steps consisting of one rod secured to each end edge of the tread of the lowest step and extending slantingly upward in parallel relation to the edges of the sides of the permanent steps, said rods being slidably secured to their respective sides of the permanent steps, means to pneumatically draw the rods upward consisting of an air cylinder, a piston head provided therein, an extension extending from said piston head forwardly and reciprocating within the cylinder, with means to communicate air to the desired end of said cylinder, from the air pipe of the car comprising a pair of pipes and means to control the course of the air from the air pipe into the cylinder, said last-mentioned means comprising a valve, which valve provides a continuous means of communication between the air pipe and said cylinder by means of either of said pipes and communication between the cylinder and the atmosphere by means of the opposite pipe and a port provided at the end of said air pipe and means of connection between the forward end of said extension and the upper end of each of said rods, substantially as shown.

In testimony whereof I affix my signature in presence of two witnesses.

WILLIAM FRANKLIN WEATHERLY.

Witnesses:
J. E. CHAVER, Jr.,
R. J. SMITH.